United States Patent
Dailey et al.

(10) Patent No.: US 6,334,297 B1
(45) Date of Patent: Jan. 1, 2002

(54) COMBUSTER ARRANGEMENT

(75) Inventors: Geoffrey M Dailey; Anthony Pidcock; Desmond Close, all of Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/624,331

(22) Filed: Jul. 24, 2000

(30) Foreign Application Priority Data

Jul. 31, 1999 (GB) .............................. 9917957

(51) Int. Cl.[7] .............................. F02C 7/18; F02C 6/08
(52) U.S. Cl. ...................................... 60/39.07; 60/751
(58) Field of Search ................... 60/39.07, 751

(56) References Cited

U.S. PATENT DOCUMENTS

| | | | |
|---|---|---|---|
| 3,826,084 A | * 7/1974 | Branstrom et al. | 60/39.07 |
| 3,910,035 A | * 10/1975 | Juhasz et al. | 60/39.23 |
| 4,120,150 A | * 10/1978 | Wakeman | 60/728 |
| 4,446,692 A | * 5/1984 | Adkins | 60/39.23 |
| 4,796,429 A | 1/1989 | Verdouw | |
| 4,852,355 A | * 8/1989 | Kenworthy et al. | 560/751 |
| 5,101,620 A | 4/1992 | Shekleton | |
| 5,555,721 A | * 9/1996 | Bourneuf et al. | 60/39.75 |
| 5,581,996 A | * 12/1996 | Koch et al. | 60/39.07 |
| 5,632,141 A | * 5/1997 | Sloop et al. | 60/39.07 |
| 5,791,148 A | * 8/1998 | Burrus | 60/752 |

FOREIGN PATENT DOCUMENTS

| | | |
|---|---|---|
| GB | 2 108 202 A | 5/1983 |
| GB | 2 160 929 A | 1/1986 |
| GB | 2 175 048 A | 11/1986 |
| GB | 2 251 657 A | 7/1992 |

* cited by examiner

*Primary Examiner*—Ted Kim
(74) *Attorney, Agent, or Firm*—W. Warren Taltavull; Manelli Denison & Selter PLLC

(57) ABSTRACT

A combustor arrangement (8) for a gas turbine engine (3) comprising a combustion chamber, fuel nozzles(52a,52b), and a bled diffuser (7) located upstream of said combustion chamber to, in use, direct an airflow from an upstream compressor (6) into the combustor (8). The fuel nozzles (52a,52b) arranged in use to supply fuel into the combustion chamber where it is mixed and combusted with the airflow from the compressor (6). The bled diffuser (7) adapted to bleed off a portion of said airflow from a main airflow into the combustion chamber. At least one bleed duct (46) is connected to the bled diffuser (7) to return and direct the air bled from the diffuser (7) to a main gas flow through the engine (3) at a location downstream of the fuel supply means (52a,52b). The bled air from the diffuser (7) preferably providing cooling of a part of the gas turbine engine (3), for example part of the turbine (10) or combustor outlet vane (58), downstream of the combustor (8).

14 Claims, 5 Drawing Sheets

COMBUSTER ARRANGEMENT

FIELD OF THE INVENTION

The present invention relates generally to a combustor arrangement for a gas turbine engine and in particular to improvements to gas turbine engine combustors incorporating bled diffusers.

BACKGROUND OF THE INVENTION

In a typical gas turbine engine compressed air is delivered from a compressor to a combustor where it is mixed with fuel and is burnt within the combustor to produce a high temperature and energy gas stream. This high temperature and energy gas stream then flows into and through a turbine system which extracts energy from the stream to drive the upstream compressors which are drivingly connected to the turbines. The turbines may also extract energy from the gas stream to drive a fan, propeller or other equipment for example an electrical generator.

To achieve stable and efficient combustion of the fuel within the combustor it is important to ensure that there is a suitable air flow within and into the combustor. In particular the velocity of the air exiting the compressor is far too high for combustion to occur. Consequently as the air enters the combustor it must be diffused using a diffuser to reduce its velocity and increase its static pressure. A typical diffuser comprises a diverging duct with an increasing cross section through which the air from the compressor flows. As well as diffusing the air flow from the compressor the diffuser also distributes the air flow across the annular cross section of the combustor.

A problem with such diffusers is that a boundary layer develops adjacent to the walls of the diffuser. The air flow within this boundary layer has a lower velocity than the main flow through the diffuser. The size of the boundary layer increases as the air flows through the diffuser with the result that the airflow from the diffuser has a non uniform cross sectional velocity profile. Such a variation in air flow velocity is undesirable for stable and efficient combustion. A further problem is that the angle of divergence of the diffuser duct, and so rate of diffusion, is limited by the occurrence of separation of the boundary layer at the diffuser wall which induces flow losses. Consequently to achieve a significant amount of diffusion of the air flow and/or to distribute the air flow over a significant combustor cross sectional area a conventional diffuser must be relatively long. The available length for the diffuser however is often limited in modern gas turbine engines. This is a particular problem for modern double annular staged fuel combustor arrangements which have a large cross sectional area and require a uniform cross sectional velocity profile.

To address these problems alternative bled diffuser arrangements have been proposed. In such bled diffusers the boundary layer adjacent to the diffuser duct walls is bled from the diffuser. This reduces the size of the boundary layer so improving the uniformity of the cross sectional velocity profile and allowing greater diffuser duct angles, and so diffusion rates, to be used without boundary layer separation. Such bled diffusers are more efficient and have improved performance as compared to conventional diffusers. Various different types of such bled diffusers exist including vortex diffusers and diffusers with perforated duct walls.

Unfortunately the air bled from the diffuser is at a relatively high pressure having been compressed by the compressor. By bleeding it from the main flow the overall efficiency and performance of the gas turbine engine as a whole is reduced. Consequently the improvement of a bled diffuser efficiency and performance is often offset or even outweighed by the loss in overall efficiency and performance of the engine as a whole.

It is therefore desirable to provide a combustor arrangement for a gas turbine engine in which the performance benefit of a bled diffuser can be utilised without significantly affecting the overall performance of the gas turbine engine as a whole and/or which offers improvements generally.

SUMMARY OF THE INVENTION

According to the present invention there is provided a combustor arrangement for a gas turbine engine comprising a combustion chamber, fuel nozzles, and a bled diffuser located upstream of said combustion chamber to, in use, direct an airflow from an upstream compressor into the combustor with the fuel nozzles arranged in use to supply fuel into the combustion chamber where it is mixed and combusted with the airflow from the compressor, the bled diffuser adapted to bleed off a portion of said airflow from a main airflow into the combustion chamber; characterised in that at least one bleed duct is connected to the bled diffuser to, in use, return and direct air bled from the diffuser to a main gas flow through the engine at a location downstream of the fuel nozzles.

Preferably the at least one bleed duct is arranged to supply the air bled from the diffuser to a part of the gas turbine engine downstream of the fuel nozzles so that, in use, the air bled from the diffuser provides cooling of said part of the gas turbine engine.

The combustor may be disposed upstream of a turbine of a gas turbine engine, the at least one bleed duct connected to the turbine to, in use, return and direct the air bled from the diffuser to the main gas flow through the turbine.

Preferably at the downstream end of the combustion chamber there is an array of outlet guide vane, within each vane of the array internal cooling passages are defined which exhaust into the main airflow, the at least one bleed duct interconnects the bled diffuser with the internal cooling passages of said vanes so that in use air bled from the diffuser exhausts into the main gas flow through the internal vane cooling passages. The internal cooling passages may be defined in an aerofoil portion of the vane. The vane may comprise a platform and aerofoil and the internal cooling passages may be defined in the platform of the vane.

Furthermore the internal cooling passages exhaust adjacent to a downstream portion of the vanes.

Preferably the at least one bleed duct is located radially inwardly of the combustion chamber. Alternatively the at least one bleed duct is located radially outwardly of the combustion chamber.

The bled diffuser may comprise a vortex controlled bled diffuser.

Preferably the combustor is of a staged combustor type.

The bled diffuser may be defined by radially inner and outer diffuser duct walls and, in use, the main airflow flows between these inner and outer diffuser duct walls, at least one opening is defined in each of the diffuser duct walls through which, in use, air is bled. The at least one duct extends between the inner and outer diffuser duct walls to, in use, interconnect the air bled through the openings defined in each of the diffuser duct walls. Alternatively the at least one bleed duct comprises at least two bleed ducts, the first bleed duct interconnected with the opening in the inner diffuser duct wall and the second bleed duct interconnected with the opening in the outer diffuser duct wall.

The combustor arrangement may further comprise a combustor casing which at least in part is of a double walled construction defining the at least one bleed duct.

BRIEF DESCRIPTION OF THE DRAWINGS

The present invention will now be described by way of example only with reference to the following figures in which.

DETAILED DESCRIPTION OF THE INVENTION

Figure 1:
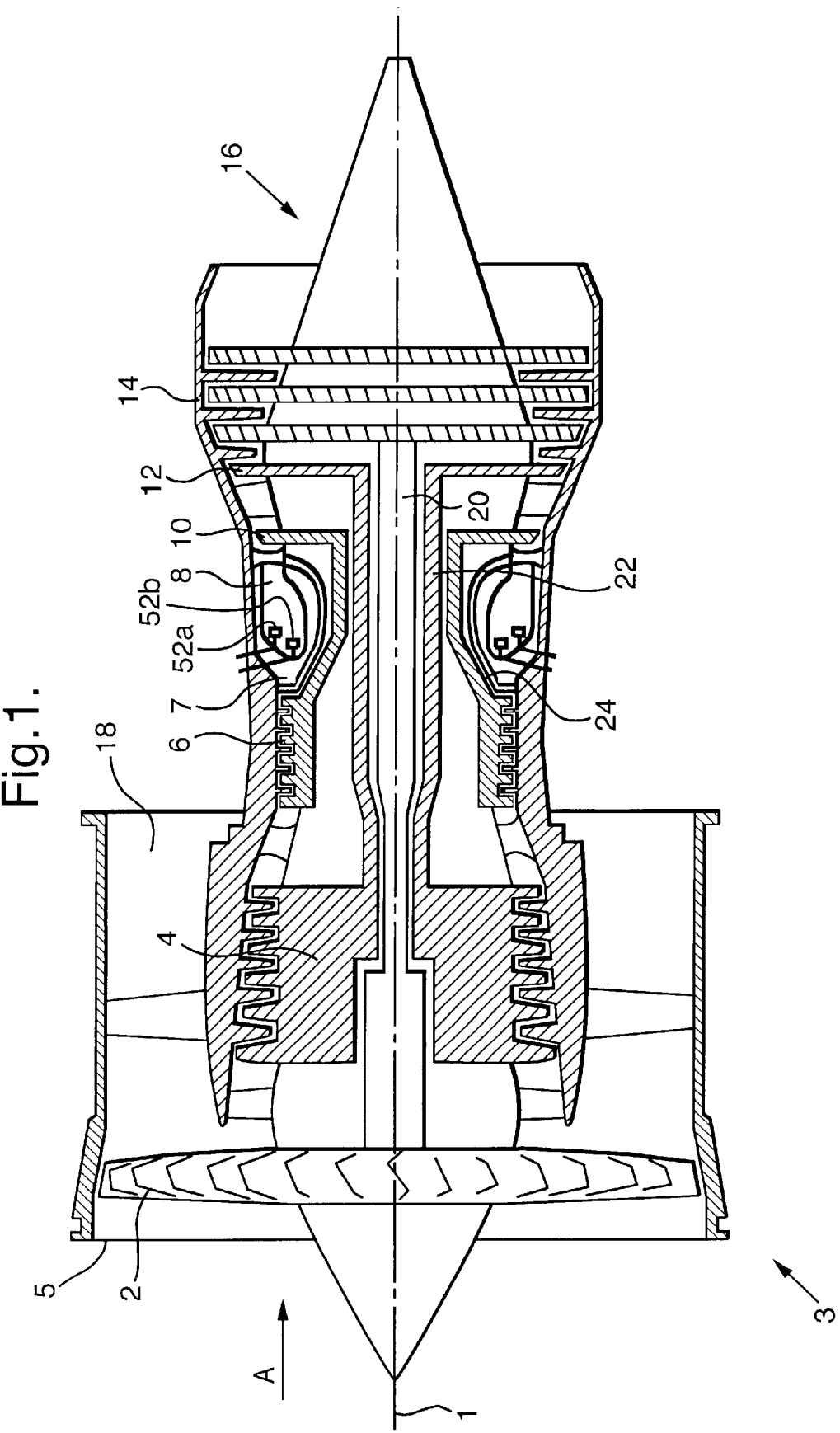
FIG. 1 shows a schematic representation of a gas turbine engine incorporating a combustor arrangement according to the present invention.

With reference to FIG. 1 a ducted fan gas turbine engine 3 comprises, in axial flow series an air intake 5, a propulsive fan, an intermediate pressure compressor 4, a high pressure compressor 6 a combustor arrangement 8, a high pressure turbine 10, an intermediate pressure turbine 12, a low pressure turbine 14, and an exhaust nozzle 16. The compressors 4,6, and turbines 10,12,14 are of an axial flow type and comprise alternate rotary stages that rotate about a central engine axis 1 and stationary vanes. The invention however is equally applicable to other conventional gas turbine engine arrangements including those which do not incorporate a separate intermediate pressure compressor and turbine.

The gas turbine engine 3 works in a conventional manner so that air entering the intake 5 is accelerated by the fan 2. Air exiting the fan 2 is split into two flows. A first air flow flows through a bypass duct 18 and exhausts the engine to provide propulsive thrust. The second air flow enters the intermediate pressure compressor 4. The intermediate pressure compressor compresses the air flow directed into it before delivering the air to the high pressure compressor 6 where further compression takes place. The compressed air exits the high pressure compressor 6 and enters the combustor arrangement through a diffuser 7. Within the diffuser the flow area is increased, reducing the velocity of the airflow and increasing its static pressure. The diffuser 7 also distributes the airflow radially across the radial depth of the combustor arrangement and stabilises the airflow into the combustor arrangement. Within the combustor arrangement the air is mixed with fuel supplied via fuel nozzles 52a,52b and the mixture combusted. The resultant hot combustion gases then expand through, and thereby drive, the high 10, intermediate 12 and low pressure 14 turbines causing them to rotate about the engine axis 1, before being exhausted through the nozzle 16 to provide additional propulsive thrust. The high 10, intermediate 12, and low 14 pressure turbines are drivingly interconnected respectively with the high 6, intermediate 4 pressure compressors and fan 2 via respective interconnecting shafts 24,22,20. The direction of airflow through the engine 3 is shown by arrow A and the terms upstream and downstream used throughout this description are used with reference to this general flow direction.

Figure 2:
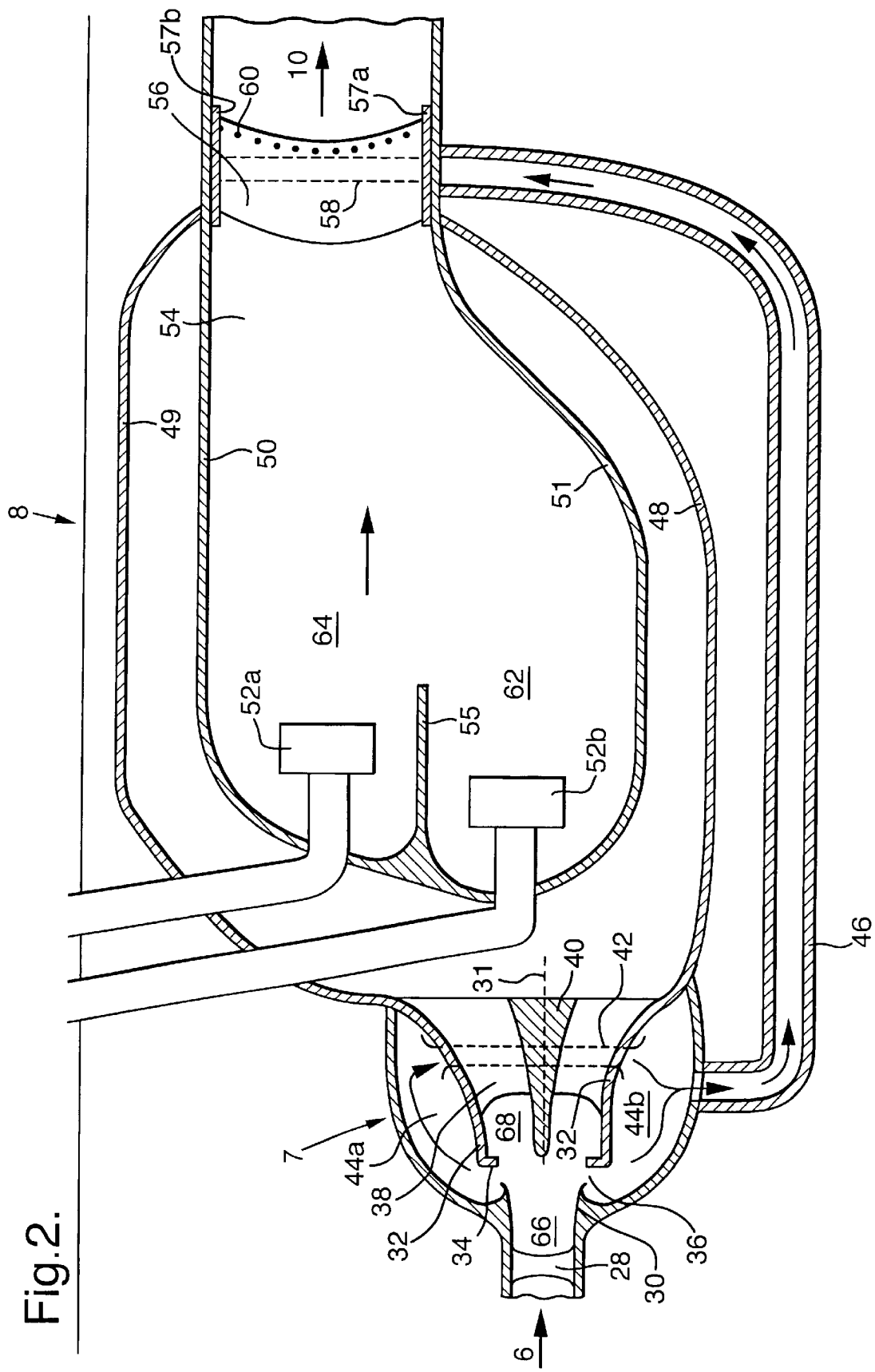
FIG. 2 shows a more detailed sectional view of the combustor arrangement shown in FIG. 1.

The combustor arrangement is shown in more detail in FIG. 2. The combustor arrangement comprises radially inner and outer annular combustor casing walls 48,49. Within the annular space between these walls 48,49 a further pair of walls 50,51 define an annular combustion chamber. Fuel is directed into the combustion chamber through a number of fuel nozzles 52a,52b located at the upstream end of the combustion chamber. The fuel nozzles 52a,52b spray fuel into air delivered from the high pressure compressor 6 which enters the combustion chamber through suitable ports (not shown) within the combustion chamber walls 50,51. The resulting fuel air mixture is then combusted. The resultant high energy combustion products discharge through the downstream end 54 of the combustion chamber and combustor arrangement through an annular array of combustor outlet guide vanes/high pressure turbine inlet guide vanes 58.

The combustor arrangement shown is of a staged double annular type well known in the art. The fuel nozzles 52a, 52b are arranged in two distinct annular arrays/sets which are radially spaced within the chamber. Each array/set of fuel nozzles comprises a number of fuel nozzles which are circumferentially spaced in an annulus around the combustor 8. The radially inner set of fuel nozzles 52b, which in this embodiment are the pilot fuel nozzles, supply fuel to a first, pilot, region 62 of the combustion chamber whilst the outer, main, fuel nozzles 52a supply fuel to an outer, main, region 64. The main 64 and pilot 62 regions are partially separated by a further wall 55. As is known, by this arrangement different air fuel ratio's and combustion conditions can be provided in both regions 62,64 with low residence time combustion conditions provided within the main region 64 and high residence time more stable conditions being provided in the pilot region. The different conditions and air fuel ratios affecting the stability, efficiency and pollution products produced in each region and from the combustor as a whole. The combustion products from the pilot region 62 being entrained into the main region 64 to assist in maintaining stable combustion. In this way, more effective combustion and pollution (in particular NOx) control is produced overall. In other embodiments the location of the pilot and main burners and regions may be reversed with the pilot radially outside of the main burners. The burners may also be axially disposed as well as radially spaced or instead of being radially spaced.

Air is delivered to the combustor from the high pressure compressor 6 via outlet vanes 28 of the compressor 6 and a diffuser 7 located on the upstream end of the combustor. The diffuser comprises a first divergent annular duct 66 defined by divergent inner and outer annular diffuser duct walls 30, and a second divergent duct 68 defined by divergent inner and outer diffuser duct walls 32 downstream of the first duct 66. Downstream of the downstream end of the first duct 66 there is a sudden enlargement of the flow area essentially defined by an inner and outer annular fence 34 located on and extending radially from the upstream ends of the inner and outer walls 32 which define the second duct 68. Between the downstream end of the first duct 66 and the fence 34 there are defined inner and outer annular openings 36 which lead to inner and outer annular chambers 44b and 44a respectively.

In operation flow across the openings 36 creates a usually toroidal vortex within each of the chambers 44a and 44b, causing the flow to diffuse. Further diffusion takes lace immediately downstream of the fence 34 associated with a further pair of vortices created downstream of the fence 34, i.e. in the corner between the fence and the upstream portion of the duct 68. Further downstream the flow reattaches to the walls 32 and further diffusion continues through the duct 68.

Using such a diffuser, termed a vortex controlled diffuser, larger divergent duct wall angles can be utilised and more rapid diffusion can be produced without the normal boundary layer separation at the diffuser outlet occurring. Such boundary layer separation limits the efficient achievable rate of diffusion of conventional diffusers and distorting the velocity profile of the flow discharged from the diffuser which can adversely affect combustion downstream of the diffuser.

It is known to improve the effectiveness of a vortex controlled diffuser and to improve the stability of the vortex created by lowering the static pressure within the chambers 44a,44b by bleeding air from the chambers 44a,44b. To this end a series of ducts 42 interconnect the outer chamber 44a with the inner chamber 44b. These ducts 42 are housed within an annular array of diffuser bleed strut vanes 38 which extend between the inner and outer walls 32 of the downstream diffuser duct 68. The diffuser vane 38 may also support an annular splitter 40, as shown in this embodiment, which aids in distributing the air radially within the combustor. A main bleed duct 46 is connected to chamber 44b in order to bleed air from both the inner and outer chambers 44a,44b. This main bleed duct is disposed radially inside of the combustor and extends downstream towards the downstream end of the combustor to the combustor outlet guide vanes 56. In addition, and in effect, bleeding the air from the diffuser walls 30,32 removes the boundary layer that is generated adjacent to the diffuser duct walls 30,32. This boundary layer being of a relatively low velocity and low energy, relative to the main portion of the flow through the duct 66,68, and thus adversely affecting the velocity distribution of the flow. The boundary layer is also liable to separation which reduces the efficiency of the diffuser. Removing the boundary layer from the diffuser flow is therefore advantageous.

The relatively cool air, as compared to the temperature at the combustor 8 outlet 54, bled from the diffuser is supplied via the main bleed duct 46 to internal cooling passages 58 within the combustor outlet guide vanes 56. Although the bled air is cooler than the temperature at the combustor outlet 54 and upstream parts of the turbines 10,12,14 the bled air is hotter than the bulk air flow through the diffuser duct 66,68 since the bled air originates from the boundary layer region which is hotter than the bulk flow. However as the bled air flows through the main bleed duct 46 heat transfer occurs which reduces the temperature of the bled boundary layer air by virtue of the lower bulk air temperature surrounding the main bleed duct 46.

The internal cooling passages 58 are connected to, and supply the bleed air to, effusion cooling holes within the rear downstream portion and trailing edge of the vanes 56. The bleed air being at a lower temperature than that of or adjacent to the vanes 56 so that the bleed air cools the vanes 56. Due to the aerodynamic profile of the vanes 56 the static pressure at the rear downstream portion and trailing edge of the vanes is lower than that within the diffuser chamber 44a,44b. Air will therefore be bled from the chamber 44a,44b via the main bleed duct 46 and internal vane cooling passages 58 to be discharged through the rear downstream portion and trailing edge effusion cooling holes 60 back into the main flow through the engine, as shown by the flow arrows in FIG. 2.

By this arrangement the air that is bled from the diffuser to improve the diffuser performance is also advantageously used to provide cooling of the outlet guide vanes 56 and also provide film cooling of the outer surface of the vanes 56 to protect the surface of the vanes 56. The air bled from the diffuser is also returned to the main flow at the upstream end of the high pressure turbine 10. The bled air, which has been compressed by the upstream compressors 6 is therefore not wasted and will flow through the high pressure 10 and other downstream turbines 12,14 where it will do some useful work. Consequently the performance loss associated with bleeding high pressure air from the main flow is minimised. In addition conventionally dedicated cooling air is used to cool the outlet guide vanes 56. By using air required to be bled from the diffuser 7 to improve the diffuser 7 performance to cool the guide vanes 56, less or no dedicated cooling air is required to be supplied specifically for such guide vane 56 cooling. It will be appreciated that further cooling air, in addition to the air bled from the diffuser, may be required to further cool the vanes 56. Such additional air, in particular to cool the leading edge of the vanes 56 will be supplied in the conventional manner via further ducting (not shown) possibly also located between the walls 48,49.

As shown the internal cooling passages 58 within the vanes 56 are provided within an aerofoil portion of the vane 56. The inner and outer platform portions 57a,57b of the vane 56 which define the outer walls of the flow path through the vane 56 are also exposed to the high temperature gas flow. It is known to provide conventionally derived cooling air to these portions of the vane using internal cooling passages and effusion cooling holes within these vane platforms. In alternative embodiments of the invention the main bleed duct may be connected to these platform internal cooling passages to provide cooling of the vane platforms 57a,57b.

Figure 3:
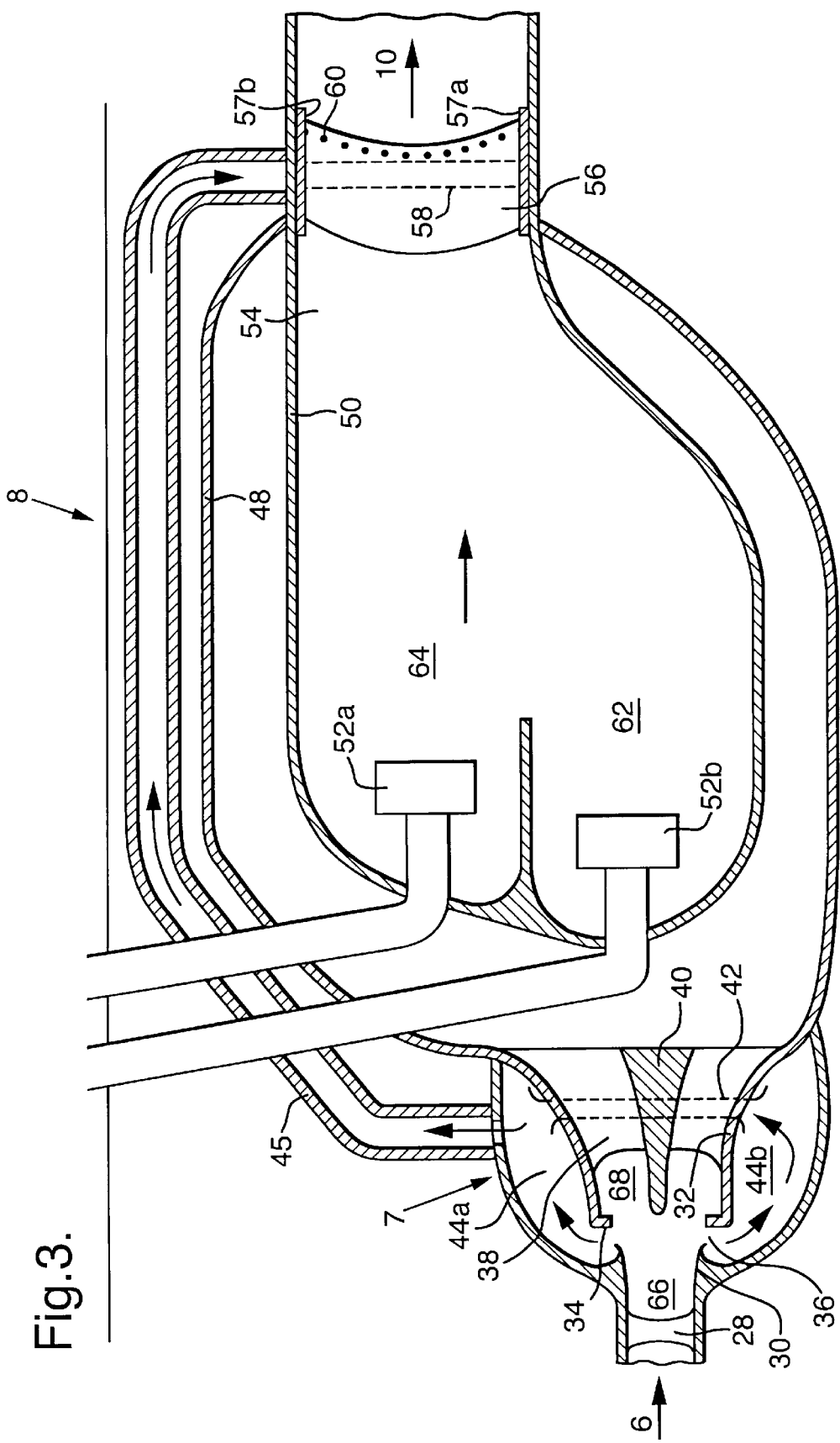
FIGS. 3 to 5 are diagrammatic representations of different alternate embodiments of combustor arrangements according to the present invention.
Figure 4:
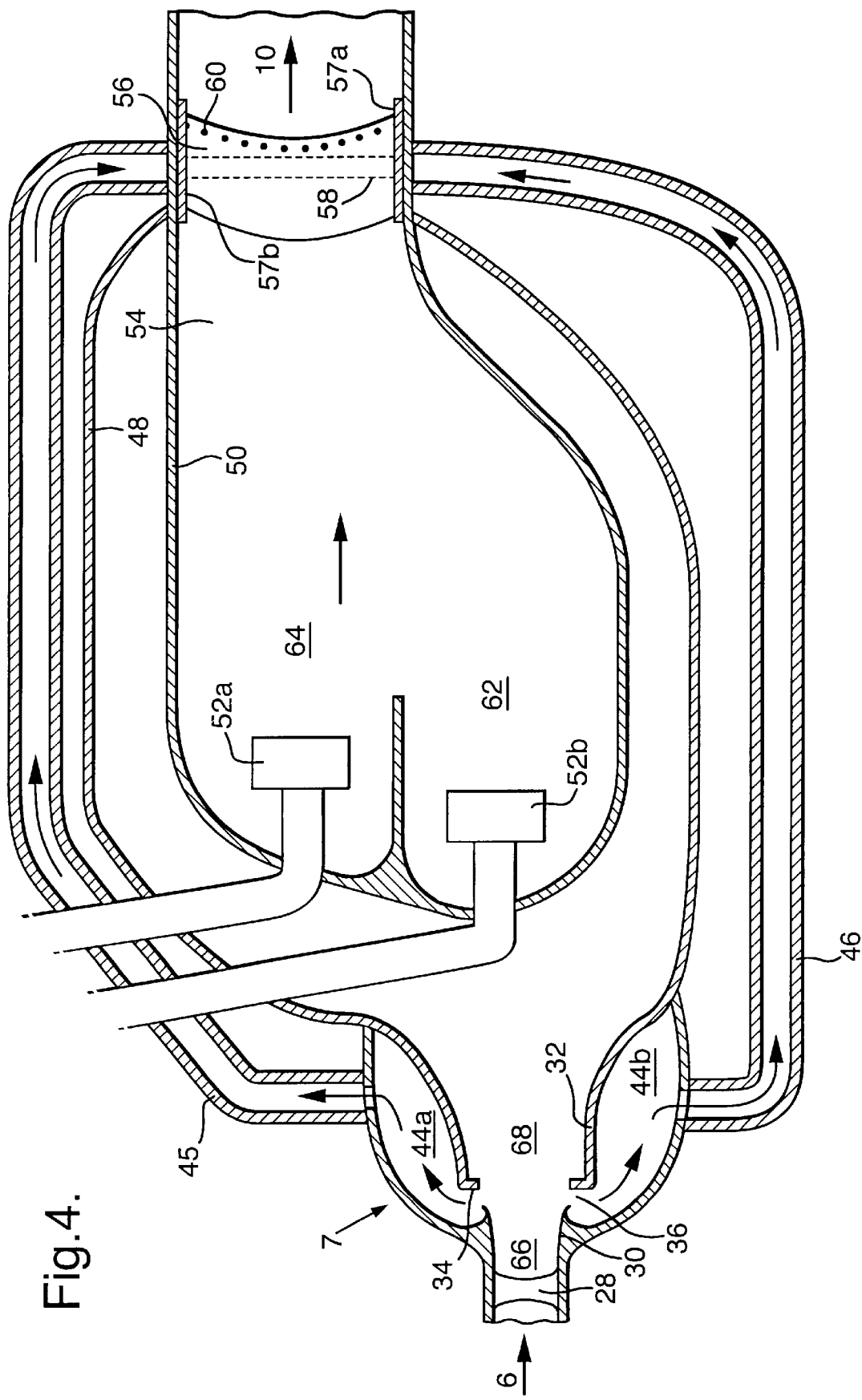
Figure 5:
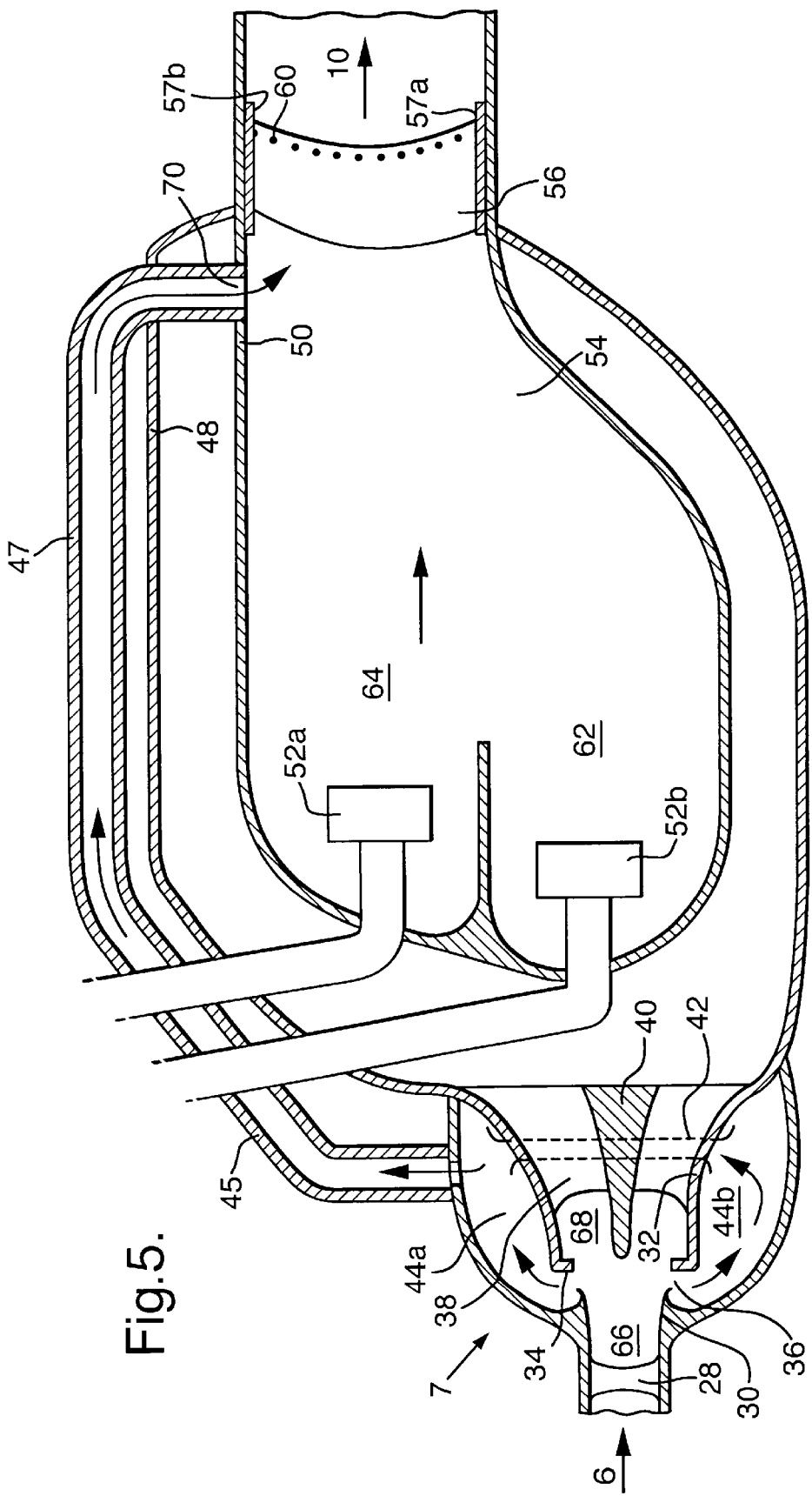

Further embodiments of the invention are shown in FIGS. 3 to 5. These are generally similar to the embodiment described and shown in FIG. 2. Consequently like references have been used for like features and only the differences between the various embodiments will be described.

Referring to FIG. 3 the main bleed duct 46 of FIG. 2 is replaced with an alternative main bleed duct 45. This bleed duct 45 similarly interconnects the diffuser 7 with the combustor outlet guide vanes 56 in order to bleed air from the inner and outer chambers 44a,44b. In this case however the bleed duct 45 is disposed radially outside of the combustor and is connected to chamber 44a. Air from the inner chamber 44b is bled through duct 42 into the outer chamber 44a and into the bleed duct 45.

In the embodiment shown in FIG. 4 two sets of inner 45 and outer 46 bleed ducts are provided. These interconnect and bleed the respective inner 44b and outer 44a chambers of the diffuser 7 and supply the bled air to inner and outer ends of internal cooling passages 58 within the combustor outlet guide vanes 56. The duct 42 (shown in FIG. 2) and diffuser bleed strut vanes 38 are now no longer required. The flow through the diffuser duct 68 is thereby improved and the diffuser simplified. There is also a weight reduction, however this is offset, at least partially, by the requirement to provide two main bleed ducts 45,46 rather than one.

The flow characteristics of the combustor may result in the static pressure at the downstream end 54 of the combustor being sufficiently low, as compared to the pressure of the air bled from the diffuser 7. If this is the case then, as shown in FIG. 5, the air bled from the diffuser can be returned to the main flow at this point 54, with a duct 47 interconnecting the diffuser 7 and the downstream end 54 of the combustor.

The air bled from the diffuser can also be returned to other suitable locations within the downstream portions of the gas turbine engine 3, for example other vanes or blades within the turbine stages or elsewhere, with the main bleed duct connecting to these locations. The air bled from the diffuser being similarly used to provide cooling at these locations.

As shown and described in the above embodiments the bleed ducts 45,46,47 are separate from the combustor walls 48,49. It will be appreciated however that if the respective walls 45,48 are of a double walled construction then the ducts 45,46,47 can be incorporated with the walls, with the air bled from the diffuser 7 flowing within the space between the double walls.

It will also be appreciated that although the present invention has been described with reference to vortex controlled bled diffusers it is also applicable to other types of bled diffuser.

Due to their superior performance bled diffusers are most applicable for use with staged double annular combustors. Such combustors place considerable demands on the diffuser performance due to the considerable radial cross section over which the inlet air must be distributed in such combustors, their requirement for a particularly uniform inlet airflow, and the relatively short axial length available for the diffuser. In addition it is often difficult to adequately supply air to the burners of such combustors. Consequently, as described in the embodiments the invention is most applicable for use with staged combustors since these are most likely to incorporate a bled diffuser. It will be appreciated though that the invention can be equally applied to other types of combustors which incorporate a bled diffuser.

The combustor defined by walls 48,49,50,51, diffuser and bleed ducts 46,45,47 have all been described as of an annular arrangement disposed around the engine axis 1. Such annular combustor arrangements are the most typical in modern gas turbine engines. It will be appreciated however that other combustor arrangements are known. For example the annular combustion chamber defined walls 50,49 could be replaced by a number of individual cylindrical combustion chambers, or cans disposed circumferentially within the combustor. A non annular diffuser arrangement is also possible and known. Such a diffuser comprising a number of separate diffuser ducts. The bleed duct 46,45,47 diffuser may also comprise a number of individual ducts rather than the single annular ducts shown and described in the particular embodiments.

We claim:

1. A combustor arrangement for a gas turbine engine comprising a combustion chamber, fuel nozzles, and a bled diffuser located upstream of said combustion chamber to, in use, direct an airflow from an upstream compressor into the combustor with the fuel nozzles arranged in use to supply fuel into the combustion chamber where it is mixed and combusted with the airflow from the compressor, a bled diffuser adapted to bleed off a portion of said airflow from a main airflow into the combustion chamber; wherein the combustor arrangement comprises at least one bleed duct, the at least one bleed duct is connected to the bled diffuser to, in use, return and direct air bled from the diffuser to a main gas flow through the engine at a location downstream of the fuel nozzles, said bled diffuser being defined by radially inner and outer diffuser duct walls and, in use, the main airflow flowing between said inner and outer diffuser duct walls, at least one opening being defined in each of the diffuser duct walls through which, in use, air is bled with said radially inner duct wall surrounding a path for the main air flow from said upstream compressor and said openings in said diffuser duct walls being of a size to increase the pressure of the air in said bled diffuser to a magnitude to allow the air fed through said at least one bleed duct to enter the main airflow downstream of said fuel nozzles, said radially inner and radially outer walls of said bled diffuser being shaped to provide a chamber of a size that will slow the velocity of the air entering from said upstream compressor.

2. A combustor arrangement as claimed in claim 1 wherein the at least one bleed duct is arranged to supply the air bled from the diffuser to a part of the gas turbine engine, the part of the gas turbine engine disposed downstream of the fuel nozzles so that, in use, the air bled from the diffuser provides cooling of said part of the gas turbine engine.

3. A combustor arrangement as claimed in claim 1 wherein the combustor is disposed upstream of a turbine of a gas turbine engine, the at least one bleed duct connected to the turbine to, in use, return and direct the air bled from the diffuser to the main gas flow through the turbine.

4. A combustor arrangement as claimed in claim 1 wherein at the downstream end of the combustion chamber there is an array of outlet guide vanes, within each vane of the array internal cooling passages are defined, the internal cooling passages exhaust into the main gas flow, the at least one bleed duct interconnects the bled diffuser with the internal cooling passages of said vanes so that in use air bled from the diffuser exhausts into the main gas flow through the internal vane cooling passages.

5. A combustor arrangement as claimed in claim 4 wherein the vane has an aerofoil portion, the aerofoil portion defining internal cooling passages.

6. A combustor arrangement as claimed in claim 4 wherein the vane comprises a platform and aerofoil and the internal cooling passages are defined in the platform of the vane.

7. A combustor arrangement as claimed in any one of claims 4 to 6 wherein the vanes comprise a downstream portion, the internal cooling passages exhaust adjacent the downstream portion.

8. A combustor arrangement as claimed in claim 1 wherein the at least one bleed duct is located radially inwardly of the combustion chamber.

9. A combustor arrangement as claimed in claim 1 wherein the at least one bleed duct is located radially outwardly of the combustion chamber.

10. A combustor arrangement as claimed in claim 1 wherein the bled diffuser comprises a vortex controlled bled diffuser.

11. A combustor arrangement as claimed in claim 1 wherein the combustor is of a staged combustor type.

12. A combustor arrangement as claimed in claim 1 wherein at least one duct extends between the inner and outer diffuser duct walls to, in use, interconnect the air bled through the openings defined in each of the diffuser duct walls.

13. A combustor arrangement as claimed in claim 1 wherein the at least one bleed duct comprises at least two bleed ducts, the first bleed duct interconnected with the opening in the inner diffuser duct wall and the second bleed duct interconnected with the opening in the outer diffuser duct wall.

14. A combustor arrangement as claimed in claim 1 wherein the combustor arrangement further comprises a combustor casing, the combustor casing which at least in part is of a double walled construction, the double walled construction defining the at least one bleed duct.

* * * * *